(12) United States Patent
Safa et al.

(10) Patent No.: US 12,417,115 B1
(45) Date of Patent: Sep. 16, 2025

(54) ON-DEMAND CODE EXECUTION COMPUTING RESOURCE ACCESS MANAGEMENT

(71) Applicant: Amazon Technologies, Inc., Seattle, WA (US)

(72) Inventors: Nashad Ahmed Safa, Bothell, WA (US); Prashant Kumar Singh, Seattle, WA (US); Kshitij Gupta, Seattle, WA (US); Jess Louis Lacy, Longmont, CO (US); Ravi S. Nagayach, Aurora, IL (US); Hari Ohm Prasath Rajagopal, Tracy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 18/478,749

(22) Filed: Sep. 29, 2023

(51) Int. Cl.
*G06F 15/16* (2006.01)
*G06F 9/455* (2018.01)

(52) U.S. Cl.
CPC ............... *G06F 9/45558* (2013.01); *G06F 2009/45587* (2013.01); *G06F 2009/45595* (2013.01)

(58) Field of Classification Search
CPC ....... G06F 9/45558; G06F 2009/45587; G06F 2009/45595
See application file for complete search history.

(56) References Cited

U.S. PATENT DOCUMENTS

| | | | |
|---|---|---|---|
| 8,595,378 B1 * | 11/2013 | Cohn | G06F 9/455 709/239 |
| 2019/0182207 A1 * | 6/2019 | Tsirkin | G06F 9/45558 |
| 2022/0239627 A1 * | 7/2022 | Devireddy | H04L 61/5007 |
| 2025/0077214 A1 * | 3/2025 | Banaal | G06F 8/65 |

* cited by examiner

Primary Examiner — John B Walsh
(74) Attorney, Agent, or Firm — Knobbe, Martens, Olson & Bear, LLP

(57) ABSTRACT

Systems and methods are provided for assigning, to a host computing device of an on-demand code execution system comprising a plurality of host computing devices, a set of network addresses available for virtual computing components instantiated on the host computing device, wherein a prefix of each network address of the set of network addresses comprises a same host computing device-specific prefix, and wherein each network address of the set of network addresses is to be accessible from outside the on-demand code execution system; determining to configure a virtual computing component on the host computing device for execution of application code, wherein the virtual computing component is associated with an identifier; and assigning, to the virtual computing component, a network address of the set of network addresses, wherein the network address comprises the prefix and is based on the identifier.

20 Claims, 6 Drawing Sheets

ON-DEMAND CODE EXECUTION COMPUTING RESOURCE ACCESS MANAGEMENT

BACKGROUND

Computing systems can utilize communication networks to exchange data. In some implementations, a computing system can receive, and process data provided by another computing system. For example, a computing system receive data entered using another computing system, store the data, process the data, and so on.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any specific element or act, the most significant digit(s) in a reference number typically refers to the figure number in which that element is first introduced.

DETAILED DESCRIPTION

Figure 1:
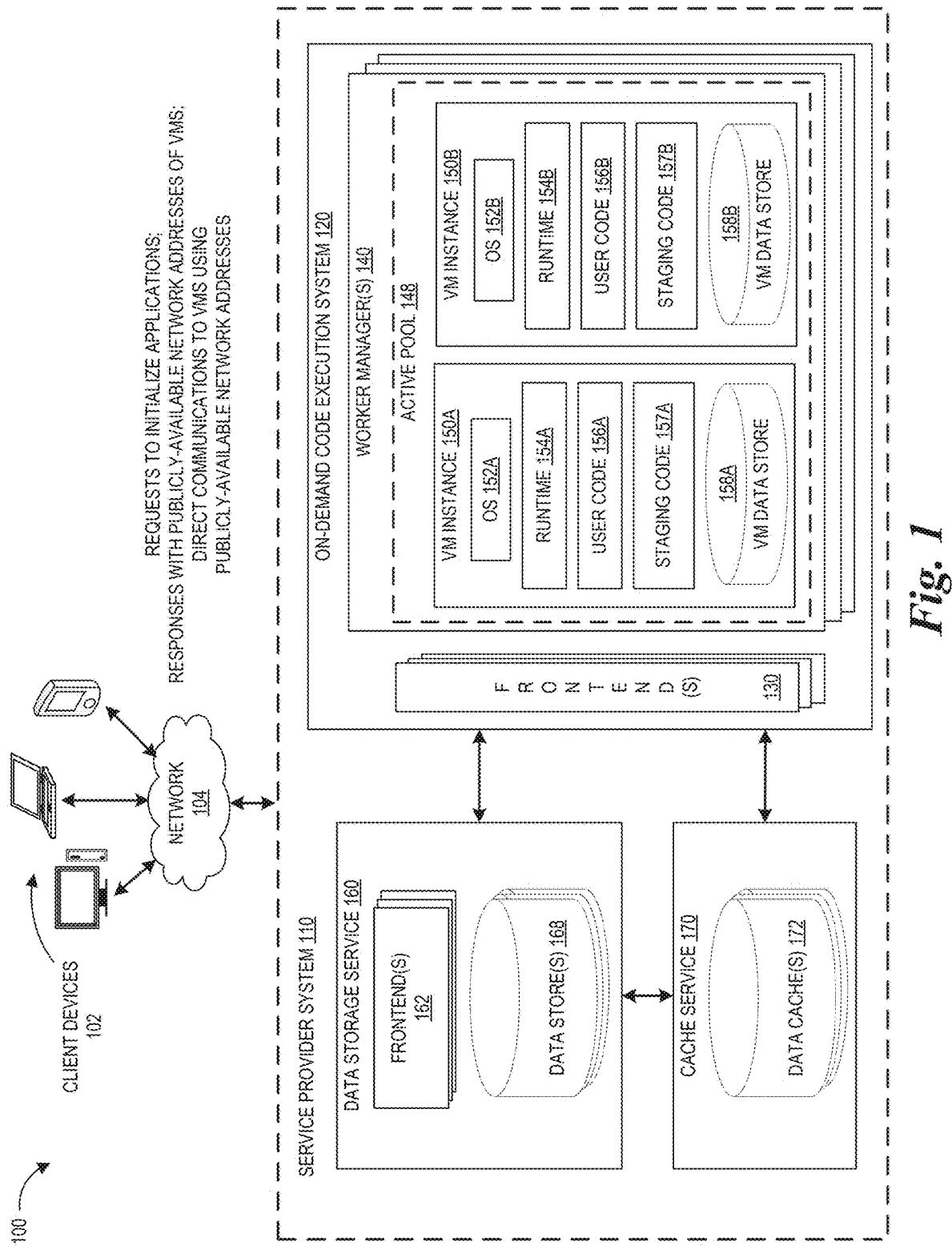
FIG. 1 is a block diagram of an illustrative computing environment including an on-demand code execution system according to some embodiments.

The present disclosure relates to managing access to application instances, including application instances executing on an on-demand code execution ("serverless") platform having a fleet of multi-tenant host computing devices configured to provide code execution services for a large number of applications (e.g., tens of thousands, hundreds of thousands, or more) simultaneously or substantially simultaneously. To facilitate access to the individual application instances from outside the on-demand code execution platform, each host computing device may be assigned a unique pool of publicly-accessible network addresses (e.g., a range of IPv6 addresses having a prefix specific to the host computing device). When an application instance is launched within a virtual execution environment on a host computing device, the virtual execution environment may be provisioned with a publicly-available network address from the pool assigned to the host computing device. The virtual execution environment may therefore be accessed from outside the on-demand code execution platform using the provisioned network address.

INTRODUCTION

Some data centers may include a number of interconnected computing systems to provide computing resources to users of the data center. To facilitate increased utilization of data center resources, virtualization technologies allow a single physical computing device to host one or more instances of virtual execution environments that appear and operate as independent computing devices to users of a data center. With virtualization, the single physical computing device can create, maintain, delete, or otherwise manage virtual execution environments such as virtual machines (VMs), microVMs, containers, or other virtual computing components (VCCs) in a dynamic manner. In turn, users can request computer resources from a data center, including single computing devices or a configuration of networked computing devices, and be provided with varying numbers of virtual resources.

In addition to computational resources, data centers provide a number of other beneficial services to client devices. For example, data centers may provide data storage services configured to store data submitted by client devices and enable retrieval of that data over a network. A variety of types of data storage services can be provided, often varying according to their input/output (I/O) mechanisms. Some data centers include an on-demand code execution system, sometimes referred to as an on-demand code execution platform.

Generally described, on-demand code execution systems enable execution of arbitrary user-designated function or application code, without requiring the user to create, maintain, or configure an execution environment (e.g., a physical or virtual machine) in which the function or application code is executed. For example, whereas conventional computing services often require a user to provision a specific device (virtual or physical), install an operating system on the device, configure application settings, define network interfaces, and so on, an on-demand code execution system may enable a user to submit code and may provide to the user an application programming interface (API) that, when used, enables the user to request execution of the code. Upon receiving a call through the API, the on-demand code execution system may dynamically generate an execution environment for the code, provision the environment with the code, execute the code, and provide a result. Thus, an on-demand code execution system can remove a need for a user to handle configuration and management of environments for code execution. Due to the flexibility of the on-demand code execution system to execute arbitrary function or application code, such a system can be used to create a variety of network services. For example, such a system could be used to create a "micro-service," a network service that implements a small number of functions (or only one function), and that interacts with other services to provide an application. As another example, such a system could be used to implement a software-as-a-service (SaaS) platform that provides customers with the ability to deploy entire applications in an on-demand serverless manner (e.g., instead of—or in addition to—individual functions).

In the context of on-demand code execution systems, the instance of function or application code executing to provide such a service is often referred to as "invoked code," or more specifically as an "invoked function" or an "invoked application," or simply as "code," a "function," or an "application," respectively, for brevity. The terms "application," "application code," and "application software" are used herein in accordance with their usual and customary meaning in the field of computer technology, and refer to a computer program (or set of computer programs) designed to carry out a specific task (or set of tasks) other than those relating solely to the operation of a computing system itself. "Functions," "function code," or "function software" may define a "task," and implement specific functionality corresponding to that task when executed on a virtual machine instance of the on-demand code execution system. Applications may include functions or may call external functions. Applications are typically executed by or at the instruction of end users but are not necessarily interactive. For example, an application may be scheduled to execute or be triggered to execute in response to an event and may perform various processing tasks before terminating without any end user interaction.

The infrastructure or configuration of an on-demand code execution system may place certain limitations on running functions or applications. In some cases, these limitations can interfere with or prevent access to individual virtual computing components from outside the on-demand code execution system, even when a virtual computing component is running a continuously-executing or otherwise long-running application, and even when the application owner desires to access (or permit access to) the application from outside the on-demand code execution system. For example, the quantity of virtual computing components executing on an individual host computing device—and in the on-demand code execution system as a whole—may be prohibitively large when considering the quantity of publicly-available IPv4 addresses. Some conventional systems may use a proxy to solve the problem of a lack of publicly-available IPv4 addresses. However, in order to determine an intended destination virtual computing component for an incoming packet, the proxy may need to terminate Secure Sockets Layer (SSL) or Transport Layer Security (TLS) encryption between endpoints, which can be undesirable from a security standpoint. Other conventional systems may use destination port network address translation (NAT) to forward incoming packets to the intended destination virtual computing component. To accomplish this, the on-demand code execution system may need to return the assigned port of the relevant VCC to the external device, and install the NAT rules that will forward traffic destined for that specific VCC to a specific port. External devices would then need to establish a connection to the designated port. This comes with the limitation that application owners cannot choose arbitrary ports or dynamically open multiple ports for their applications after the VCC for the application is launched.

Some aspects of the present disclosure address some or all of the issues noted above, among others, by assigning unique sets of publicly-available network addresses to host computing devices of on-demand code execution system. In some embodiments, the set of publicly-available network addresses assigned to a particular host computing device may be a set of IPV6 address having the same prefix, and that prefix may be unique to the host computing device itself. This process may be referred to as prefix delegation, and the prefix may be referred to as a host computing device-specific prefix. Using prefix delegation in this way, the on-demand code execute system can easily manage the routing of traffic to the correct physical location. When a VCC is initialized on a host computing device to execute application code, the VCC may be provisioned with a particular address of the set of publicly-available network addresses assigned to the host computing device. For example, the VCC may be assigned an identifier that is unique with respect to the VCCs on the host computing device. The unique identifier may be used to select or otherwise provision a network address to the VCC (e.g., using a combination of the host computing device's prefix and the unique VCC identifier, potentially with additional information such as randomly-generated data, etc.). Devices external to the on-demand code execution system may then use the network address to "directly" communicate with the VCC. For example, devices external to the on-demand code execution system can communicate with a VCC without use of a proxy that implements TLS termination. As a result, communications between the external device and the VCC may be encrypted end-to-end. As another example, devices external to the on-demand code execution system can communicate with a VCC without using destination port NAT, etc. As a result, an external device can communicate with a VCC using a true port number of the VCC, and the VCC can use an arbitrary port or open up ports dynamically during operation without affecting communication.

Additional aspects of the present disclosure relate to a protocol for communicating network addresses of the VCCs to devices external to the on-demand code execution system so that the external devices can communicate with the VCCs. In some embodiments, a VCC is initialized at the request of an external device. For example, the external device may send a request to begin execution of an application, to execute a function, or to perform some other operation. In response to the request, after a VCC has been initialized to execute the application and has been assigned a publicly-available network address, the assigned address may be returned to the external device. The external device may then communicate directly with the VCC using the returned address. This process may be repeated for other VCCs that are initialized on the host computing device (e.g., potentially hundreds or thousands of VCCs on a single host computing device) to provide for direct communication with the VCCs in a manner that would not otherwise be practical or possible.

In some embodiments, a firewall may be used to provide additional security and separation between the VCCs. For example, when an external device requests execution of an application, a firewall rule may be configured to permit that external device to communicate with the VCC for the application. However, unless the external device has also requested execution of other applications, the external device may not be permitted to communicate with other VCCs or other processes of the host computing device.

Various aspects of the disclosure will be described with regard to certain examples and embodiments, which are intended to illustrate but not limit the disclosure. Although aspects of some embodiments described in the disclosure will focus, for the purpose of illustration, management of on-demand code execution systems to fulfill user requirements for external communication to long-running processes, the examples are illustrative only and are not intended to be limiting. In some embodiments, the techniques described herein may be applied to additional or alternative types of function code (e.g., subroutines), data sets, and on-demand code execution system configurations. Additionally, any feature used in any embodiment described herein may be used in any combination with any other feature or in any other embodiment, without limitation.

Example Network Environment

An on-demand code execution system may provide a network-accessible service enabling users to submit or designate computer-executable source code—also referred to herein simply as "code" for brevity—to be executed by virtual machine instances or other virtual computing components on the on-demand code execution system.

Code on the on-demand code execution system may define applications. For example, an application may be an interactive application, a request-response-based application, a batch processing application, an application with a long-running background process, or a combination thereof. Additionally, or alternatively, code on the on-demand code execution system may define a "task," and implement specific functionality corresponding to that task when executed on a virtual machine instance of the on-demand code execution system. Tasks may be implemented as stand-alone on-demand functions, or as features of a larger application (e.g., an application with an additional background process as described above). Individual implementations of the task on the on-demand code execution system may be referred to as an "execution" of the task (or a "task execution").

In some embodiments, the on-demand code execution system may enable users to directly trigger execution of an application or an individual task based on a variety of potential events, such as transmission of an API request or specially formatted hypertext transport protocol ("HTTP") packet to the on-demand code execution system. The on-demand code execution system can therefore execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "realtime" (e.g., with little or no perceptible delay to an end user). To enable this rapid execution, the on-demand code execution system can include one or more virtual machine instances that are "pre-warmed" or pre initialized (e.g., booted into an operating system and executing a complete or substantially complete runtime environment) and configured to enable execution of user-defined code, such that the code may be rapidly executed in response to a request to execute the code, without delay caused by initializing the virtual machine instance. The pre-warmed or pre initialized virtual machine instances may be allocated a minimum non-zero level of computing capacity to run a background process(es), as described above, and begin executing the process(es) when booted. Thus, when an execution of an "on-demand" task is triggered, the code corresponding to that task can be executed within a pre-initialized virtual machine in a very short amount of time. The background process(es) may continue to run during and subsequent to the execution of the "on-demand" task.

Specifically, to execute applications or individual tasks, the on-demand code execution system described herein may maintain a pool of executing virtual machine instances or other virtual computing components that are ready for use as soon as a request to execute a task is received. Due to the pre initialized nature of these virtual machines, delay (sometimes referred to as latency) associated with executing the application code or stand-alone task code (e.g., instance and language runtime startup time) can be significantly reduced, often to sub 100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. Any virtual machine instance may additionally be configured to run background process(es).

When the on-demand code execution system receives a request to execute a task, the on-demand code execution system may select a virtual machine instance for executing the program code of the user based on the one or more computing constraints related to the task (e.g., a required operating system or runtime) and cause the task to be executed on the selected virtual machine instance. The tasks can be executed in isolated containers that are created on the virtual machine instances or may be executed within a virtual machine instance isolated from other virtual machine instances acting as environments for other tasks. Since the virtual machine instances in the pool have already been booted and loaded with specific operating systems and language runtimes, and optionally background process(es) by the time the requests are received, the delay associated with finding compute capacity that can handle the requests (e.g., by executing the user code in one or more containers created on the virtual machine instances) can be significantly reduced.

As used herein, the term "virtual machine instance" is intended to refer to an execution of software or other executable code that emulates hardware to provide an environment or platform on which software may execute (an example "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, applications, tasks or other processes may be executed within a software "container," which provides a runtime environment without itself providing virtualization of hardware. Containers may be implemented within virtual machines to provide additional security or may be run outside of a virtual machine instance.

In some cases, application owners may desire to communicate with their applications from outside the on-demand code execution system, or permit communications to the applications from other external devices. To facilitate such external communication with an application, the virtual machine or other VCC within which the application is executing may be assigned a publicly-available network address, as described in greater detail below.

FIG. 1 is a block diagram of an illustrative operating environment 100 in which a service provider system 110 operates to enable client devices 102 to submit or request invocation of user-defined code by an on-demand code execution system 120, and to enable direct or substantially direct communication with the user-defined code from outside the on-demand code execution system 120.

By way of illustration, various example client devices 102 are shown in communication with the service provider system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like.

Generally described, the data storage service 160 can operate to enable clients to read, write, modify, and delete data, such as files, objects, blocks, or records, each of which represents a set of data associated with an identifier (an "object identifier" or "resource identifier") that can be interacted with as an individual resource. For example, an object may represent a single file submitted by a client device 102 (though the data storage service 160 may or may not store such an object as a single file). This object-level interaction can be contrasted with other types of storage services, such as block-based storage in which data is manipulated at the level of individual blocks or database storage in which data manipulation may occur at the level of tables or the like.

The data storage service 160 illustratively includes one or more frontends 162, which provide an interface (a command-line interface (CLIs), application programing interface (APIs), or other programmatic interface) through which client devices 102 can interface with the service 160 to configure the service 160 on their behalf and to perform I/O operations on the service 160. For example, a client device 102 may interact with a frontend 162 to create a collection of data objects on the service 160 (e.g., a "bucket" of objects) and to configure permissions for that collection. Client devices 102 may thereafter create, read, update, or delete objects within the collection based on the interfaces of the frontends 162. In one embodiment, the frontend 162 provides a REST-compliant HTTP interface supporting a variety of request methods, each of which corresponds to a requested I/O operation on the service 160.

During general operation, frontends 162 may be configured to obtain a call to a request method and apply that request method to input data for the method. For example, a frontend 162 can respond to a request to PUT input data into the service 160 as an object by storing that input data as the object on the service 160.

Data may be stored, for example, on data stores 168, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend 162 can respond to a request to access a data set or portion thereof from the service 160 by retrieving the requested data from the stores 168 (e.g., an object representing input data to a GET resource request), and returning the object to a requesting client device 102.

In some cases, calls to a request method may invoke one or more native data manipulations provided by the service 160. For example, a SELECT operation may provide an SQL-formatted query to be applied to an object (also identified within the request), or a GET operation may provide a specific range of bytes of an object to be returned.

The service provider system 110 illustratively includes a cache service 170 configured to cache data sets for code executed by the on-demand code execution system 120. Data may be cached, for example, on data caches 172, which correspond to any data storage such hard disk drives (HDDs), solid state drives (SSDs), network accessible storage (NAS), storage area networks (SANs), non-volatile random access memory (NVRAM), random access memory (RAM), or any of a variety oOf storage devices known in the art. Although illustrated as separate and outside of the data storage service and the on-demand code execution system 120, in some embodiments the cache service 170 may be implemented within one or both of the data storage service 160 or on-demand code execution system 120 (e.g., on physical or logical commuting systems that are part of the data storage service 160 or on-demand code execution system 120).

The client devices 102, data storage service 160, and on-demand code execution system 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The system 120 includes one or more frontends 130 which enable interaction with the on-demand code execution system 120. In an illustrative embodiment, the frontends 130 serve as a "front door" to the other services provided by the on-demand code execution system 120, enabling users (via client devices 102) to provide, request execution of, and view results of computer executable code. The frontends 130 include a variety of components to enable interaction between the on-demand code execution system 120 and other computing devices. For example, each frontend 130 may include a request interface providing client devices 102 with the ability to upload or otherwise communicate user-specified code to the on-demand code execution system 120 and to thereafter request execution of that code. In one embodiment, the request interface communicates with external computing devices (e.g., client devices 102, frontend 162, etc.) via a graphical user interface (GUI), CLI, or API. The frontends 130 process the requests and make sure that the requests are properly authorized. For example, the frontends 130 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," "function code," "application code," and "program code," may be used interchangeably. Such user code may be executed to achieve a specific function, for example, in connection with a specific data transformation developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, or Ruby (or another programming language).

To manage requests for code execution, the frontend 130 can include an execution queue, which can maintain a record of requested task executions. Illustratively, the number of simultaneous task executions by the on-demand code execution system 120 is limited, and as such, new task executions initiated at the on-demand code execution system 120 (e.g., via an API call, via a call from an executed or executing task, etc.) may be placed on the execution queue and processed, e.g., in a first-in-first-out order. In some embodiments, the on-demand code execution system 120 may include multiple execution queues, such as individual execution queues for each user account. For example, users of the service provider system 110 may desire to limit the rate of task executions on the on-demand code execution system 120 (e.g., for cost reasons). Thus, the on-demand code execution system 120 may utilize an account-specific execution queue to throttle the rate of simultaneous task executions by a specific user account. In some instances, the on-demand code execution system 120 may prioritize task executions, such that task executions of specific accounts or of specified priorities bypass or are prioritized within the execution queue. In other instances, the on-demand code execution system 120 may execute tasks immediately or substantially immediately after receiving a call for that task, and thus, the execution queue may be omitted.

The frontend 130 can further include an output interface configured to output information regarding the execution of tasks on the on-demand code execution system 120. Illustratively, the output interface may transmit data regarding task executions (e.g., results of a task, errors related to the task execution, or details of the task execution, such as total time required to complete the execution, total data processed via the execution, etc.) to the client devices 102 or the data storage service 160.

In some embodiments, the on-demand code execution system 120 may include multiple frontends 130. In such embodiments, a load balancer may be provided to distribute the incoming calls to the multiple frontends 130, for example, in a round-robin fashion. In some embodiments, the manner in which the load balancer distributes incoming calls to the multiple frontends 130 may be based on the location or state of other components of the on-demand code execution system 120. For example, a load balancer may distribute calls to a geographically nearby frontend 130, or to a frontend with capacity to service the call. In instances where each frontend 130 corresponds to an individual instance of another component of the on-demand code execution system 120, such as the active pool 148 described below, the load balancer may distribute calls according to the capacities or loads on those other components. Calls may in some instances be distributed between frontends 130 deterministically, such that a given call to execute a task will always (or almost always) be routed to the same frontend 130. This may, for example, assist in maintaining an accurate execution record for a task, to ensure that the task executes only a desired number of times. For example, calls may be distributed to load balance between frontends 130. Other distribution techniques, such as anycast routing, will be apparent to those of skill in the art.

The on-demand code execution system 120 further includes one or more worker managers 140 that manage the execution environments, such as virtual machine instances 150 (shown as VM instance 150A and 150B, generally referred to as a "VM"), used for servicing incoming calls to execute tasks. For example, the worker manager 140 may work with a supervisor process or processes. The supervisor process may be a part of the worker manager 140 or there may be a supervisor process associated with other components of the on-demand code execution system (e.g., a hypervisor, virtual machine, etc.). The supervisor process(es) may allocate resources to the execution environments. Additionally, or alternatively, the supervisor process(es) may generate execution environments with specific configurations and execute relevant startup code, where present. The startup code may include instructions to begin executing background process(es). While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance). In some embodiments, the worker manager 140 may be implemented using a host computing device, such as the host computing device 200 shown in FIG. 2 and described in greater detail below.

Although the virtual machine instances 150 are described here as being assigned to a specific task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a specific instance 150 after another task has been executed in another container on the same instance does not pose security risks. A task may be associated with permissions encompassing a variety of aspects controlling how a task may execute. For example, permissions of a task may define what network connections (if any) can be initiated by an execution environment of the task. As another example, permissions of a task may define what authentication information is passed to a task, controlling what network-accessible resources are accessible to execution of a task (e.g., objects on the service 160). In one embodiment, a security group of a task is based on one or more such permissions. For example, a security group may be defined based on a combination of permissions to initiate network connections and permissions to access network resources. As another example, the tasks of the group may share common dependencies, such that an environment used to execute one task of the group can be rapidly modified to support execution of another task within the group.

Additionally, or alternatively, in some embodiments the instances may be executing background process(es). For example, a virtual machine instance may be allocated a minimum level of resources to run background process(es). During booting of the virtual machine, the background process(es) may begin executing. Additionally, or alternatively, the user may submit startup code which is used to begin executing the background process(es). The background processes may run during and/or subsequent to a specific task or group of tasks. For example, a virtual machine instance may be configured to run a background process to monitor the number of items in a cache and send an alert if it reaches a threshold. While this process is running, the frontend 130 may receive a request to execute a task. In some embodiments, the background process may continue to run while the task is being processed. In some embodiments, multiple additional tasks may run simultaneously while the background process continues to execute. Additionally, or alternatively, multiple requests may be received at different times by frontend 130. The tasks associated with each request may be run while the background process continues to execute.

Once a triggering event to execute a task has been successfully processed by a frontend 130, the frontend 130 passes a request to a worker manager 140 to execute the task. In one embodiment, each frontend 130 may be associated with a corresponding worker manager 140 (e.g., a worker manager 140 co-located or geographically nearby to the frontend 130) and thus, the frontend 130 may pass most or all requests to that worker manager 140. In another embodiment, a frontend 130 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). In another embodiment, a frontend 130 may determine a worker manager 140 or individual host to which to pass the execution request based on a prior invocation of an application on the host (e.g., the application has been instantiated and may receive requests for processing while continuing to execute a background process). Various other mechanisms for distributing calls between worker managers 140 will be apparent to one of skill in the art.

Thereafter, the worker manager 140 may modify a virtual machine instance 150 (if necessary) and execute the code of the task within the instance 150. As discussed above, the instance 150 may already be running background process(es). As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. Thus, via operation of the on-demand code execution system 120, tasks may be rapidly executed within an execution environment.

In accordance with aspects of the present disclosure, each VM 150 additionally includes staging code 157 executable to facilitate staging of input data on the VM 150 and handling of output data written on the VM 150, as well as a VM data store 158 accessible through a local file system of the VM 150. Illustratively, the staging code 157 represents a process executing on the VM 150 (or potentially a host device of the VM 150) and configured to obtain data from the data storage service 160 or cache service 170 and place that data into the VM data store 158. The staging code 157 can further be configured to obtain data written to a file within the VM data store 158, and to transmit that data to the data storage service 160 or cache service 170. Because such data is available at the VM data store 158, user code 156 is not required to obtain data over a network, simplifying user code 156 and enabling further restriction of network communications by the user code 156, thus increasing security. Rather, as discussed above, user code 156 may interact with input data and output data as files on the VM data store 158, by use of file handles passed to the code 156 during an execution. In some embodiments, input and output data may be stored as files within a kernel-space file system of the data store 158. In other instances, the staging code 157 may provide a virtual file system, such as a filesystem in userspace (FUSE) interface, which provides an isolated file system accessible to the user code 156, such that the user code's access to the VM data store 158 is restricted.

As used herein, the term "local file system" generally refers to a file system as maintained within an execution environment, such that software executing within the environment can access data as file, rather than via a network connection. In accordance with aspects of the present disclosure, the data storage accessible via a local file system may itself be local (e.g., local physical storage), or may be remote (e.g., accessed via a network protocol, like NFS, or represented as a virtualized block device provided by a network-accessible service). Thus, the term "local file system" is intended to describe a mechanism for software to access data, rather than physical location of the data.

The VM data store 158 can include any persistent or non-persistent data storage device. In one embodiment, the VM data store 158 is physical storage of the host device, or a virtual disk drive hosted on physical storage of the host device. In another embodiment, the VM data store 158 is represented as local storage, but is in fact a virtualized storage device provided by a network accessible service. For example, the VM data store 158 may be a virtualized disk drive provided by a network-accessible block storage service. In some embodiments, the data storage service 160 may be configured to provide file-level access to objects stored on the data stores 168, thus enabling the VM data store 158 to be virtualized based on communications between the staging code 157 and the service 160. For example, the data storage service 160 can include a file-level interface providing network access to objects within the data stores 168 as files. The file-level interface may, for example, represent a network-based file system server (e.g., a network file system (NFS)) providing access to objects as files, and the staging code 157 may implement a client of that server, thus providing file-level access to objects of the service 160.

In some instances, the VM data store 158 may represent virtualized access to another data store executing on the same host device of a VM instance 150. For example, an active pool 148 may include one or more data staging VM instances (not shown in FIG. 1), which may be co-tenanted with VM instances 150 on the same host device. A data staging VM instance may be configured to support retrieval and storage of data from the service 160 (e.g., data objects or portions thereof, input data passed by client devices 102, etc.), and storage of that data on a data store of the data staging VM instance. The data staging VM instance may, for example, be designated as unavailable to support execution of user code 156, and thus be associated with elevated permissions relative to instances 150 supporting execution of user code. The data staging VM instance may make this data accessible to other VM instances 150 within its host device (or, potentially, on nearby host devices), such as by use of a network-based file protocol, like NFS. Other VM instances 150 may then act as clients to the data staging VM instance, enabling creation of virtualized VM data stores 158 that, from the point of view of user code 156A, appear as local data stores. Beneficially, network-based access to data stored at a data staging VM can be expected to occur very quickly, given the co-location of a data staging VM and a VM instance 150 within a host device or on nearby host devices.

While some examples are provided herein with respect to use of IO stream handles to read from or write to a VM data store 158, IO streams may additionally be used to read from or write to other interfaces of a VM instance 150 (while still removing a need for user code 156 to conduct operations other than stream-level operations, such as creating network connections). For example, staging code 157 may "pipe" input data to an execution of user code 156 as an input stream, the output of which may be "piped" to the staging code 157 as an output stream. As another example, a staging VM instance or a hypervisor to a VM instance 150 may pass input data to a network port of the VM instance 150, which may be read-from by staging code 157 and passed as an input stream to the user code 157. Similarly, data written to an output stream by the task code 156 may be written to a second network port of the instance 150A for retrieval by the staging VM instance or hypervisor. In yet another example, a hypervisor to the instance 150 may pass input data as data written to a virtualized hardware input device (e.g., a keyboard) and staging code 157 may pass to the user code 156 a handle to the IO stream corresponding to that input device. The hypervisor may similarly pass to the user code 156 a handle for an IO stream corresponding to a virtualized hardware output device, and read data written to that stream as output data. Thus, the examples provided herein with respect to file streams may generally be modified to relate to any IO stream.

The data storage service 160, cache service 170, and on-demand code execution system 120 are depicted in FIG. 1 as operating in a distributed computing environment including several computer systems that are interconnected using one or more computer networks (not shown in FIG. 1). The data storage service 160, cache service 170, and on-demand code execution system 120 could also operate within a computing environment having a fewer or greater number of devices than are illustrated in FIG. 1. Thus, the depiction of the data storage service 160, cache service 170, and on-demand code execution system 120 in FIG. 1 should be taken as illustrative and not limiting to the present disclosure. For example, the on-demand code execution system 120 or various constituents thereof could implement various Web services components, hosted or "cloud" computing environments, or peer to peer network configurations to implement at least a portion of the processes described herein. In some instances, the data storage service 160, cache service 170, and on-demand code execution system 120 may be combined into a single service. Further, the data storage service 160, cache service 170, and on-demand code execution system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the data storage service 160, cache service 170, and on-demand code execution system 120 are illustrated as connected to the network 104. In some embodiments, any of the components within the data storage service 160, cache service 170, and on-demand code execution system 120 can communicate with other components of the on-demand code execution system 120 via the network 104. In other embodiments, not all components of the data storage service 160, cache service 170, and on-demand code execution system 120 are capable of communicating with other components of the virtual execution environment 100. In one example, only the frontends 130 and 162 (which may in some instances represent multiple frontends) of the on-demand code execution system 120 and the data storage service 160, respectively, may be connected to the network 104, and other components of the data storage service 160 and on-demand code execution system 120 may communicate with other components of the environment 100 via the respective frontends 130 and 162.

Figure 2:
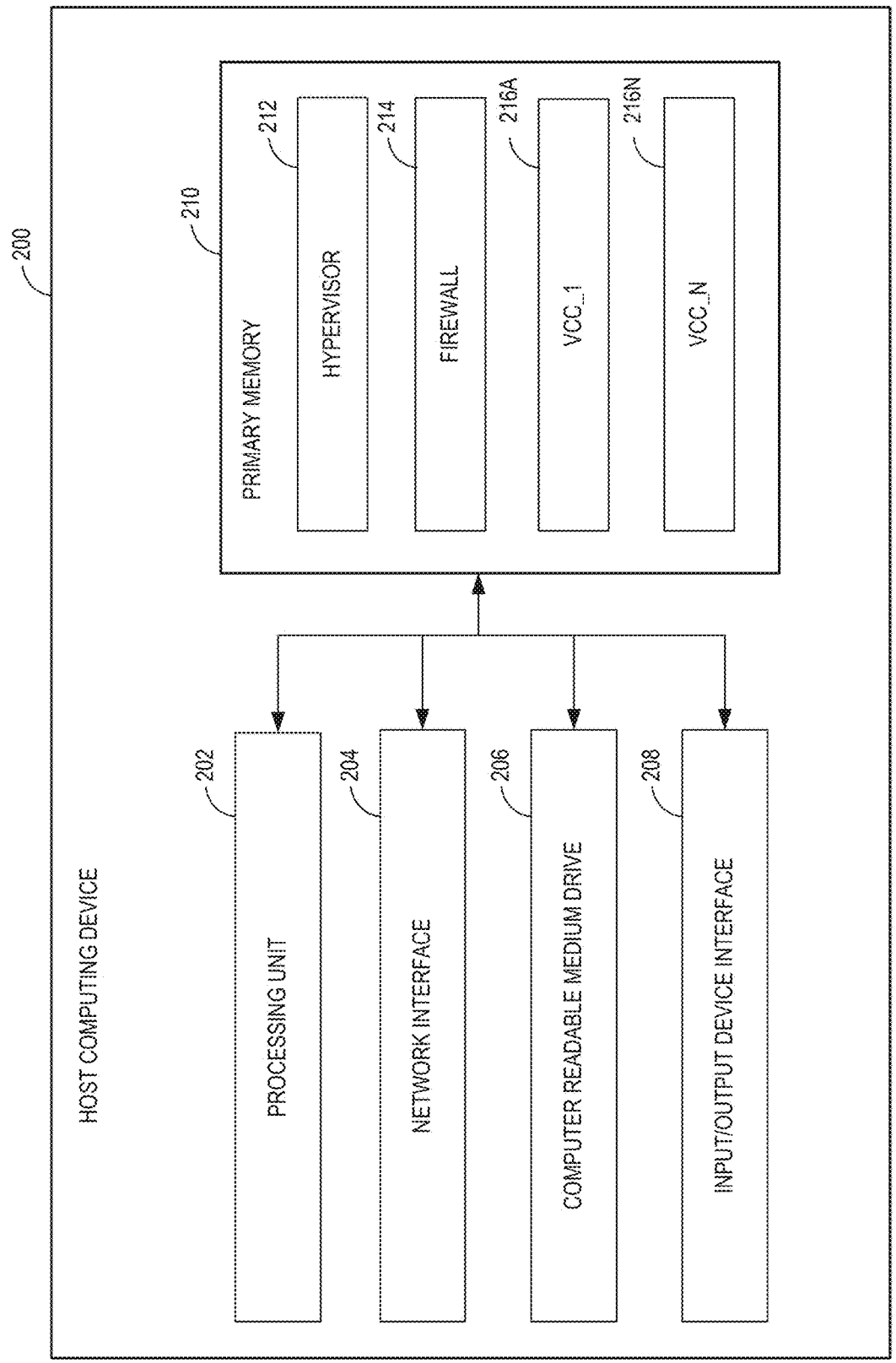
FIG. 2 is a block diagram of an illustrative host computing device of an on-demand code execution system according to some embodiments.

FIG. 2 illustrates an example host computing device 200 that may be used in some embodiments to execute the processes and implement the features described above. For example, a host computing device 200 may be used to implement a worker management 140 or to otherwise host any number of VCCs. Additionally, or alternatively, host computing devices 200 may be used to implement frontends 130 or other components of the on-demand code execution system 120, frontends 162 or other components of a data storage service 160 or cache service 170, or various other components of the operating environment 100.

A host computing device 200 may include: one or more computer processors 202, such as physical central processing units (CPUs) or graphics processing units (GPUs); one or more network interfaces 204, such as a network interface cards (NICs); one or more computer readable medium drives 206, such as hard disk drives (HDDs), solid state drives (SSDs), flash drives, one or more input/output device interfaces 208; and/or other persistent non-transitory computer-readable media; and one or more computer readable memories 210, such as random access memory (RAM) and/or other volatile non-transitory computer-readable media. The network interface 204 can provide connectivity to one or more networks or computing devices. The computer processor 202 can receive information and instructions from other computing devices or services via the network interface 204. The network interface 204 can also store data directly to the computer-readable memory 210. The computer processor 202 can communicate to and from the computer-readable memory 210, execute instructions and process data in the computer-readable memory 210, etc.

The computer-readable memory 210 may include computer program instructions that the computer processor 202 executes in order to implement one or more embodiments. The computer-readable memory 210 can store hypervisor 212 that provides computer program instructions for use by the computer processor 202 in the general administration and operation of the host computing device 200 and management of virtual component components, such as virtual machines in which applications execute. The computer-readable memory 210 can also include computer program instructions for a firewall 214 to control access to virtual computing components and to the host computing device 200. The computer-readable memory 210 can also include VCCs for applications or other custom code, such as VCC_1 216A to VCC_2 216N.

Host Computing Device and VCC Address Provisioning

Figure 3:
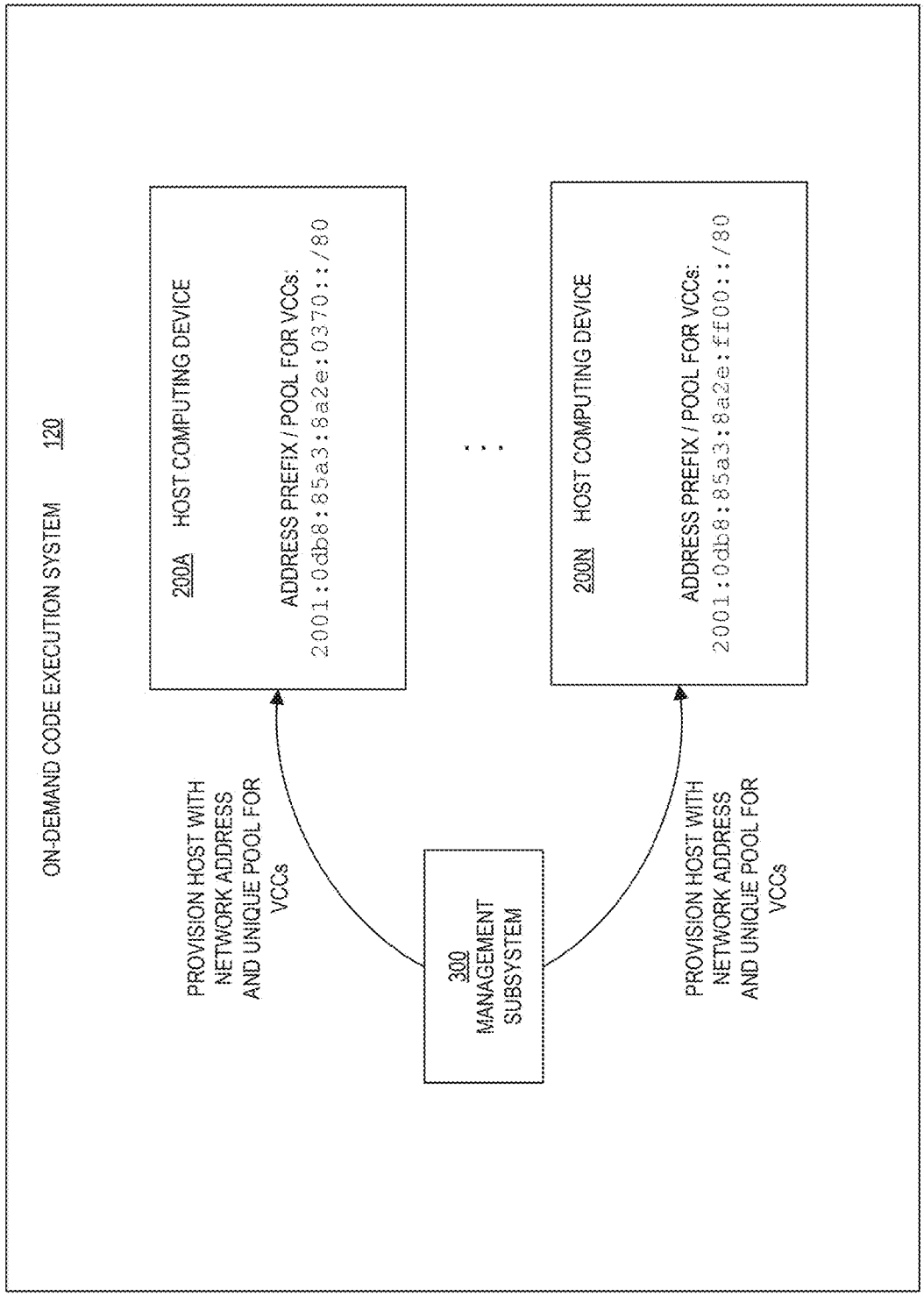
FIG. 3 illustrates data flows and interactions between components of an on-demand code execution system for provisioning of host computing devices with sets of network addresses according to some embodiments.

FIG. 3 illustrates data flows and interactions between components of an on-demand code execution system 120, which has a fleet of host computing devices 200A to 200N, for assigning publicly-available network addresses that may be used by devices external to the on-demand code execution system 120 to communicate with VCCs hosted on individual host computing devices 200.

Host computing devices 200A-200N may be used to implement the functionality of the worker managers 140 shown in FIG. 1, including hosting VMs and/or other VCCs for execution of customer-defined applications or other code. Although only two host computing devices are shown, in practice an on-demand code execution system 120 may include a fleet of hundreds or thousands (or more) host computing devices for on-demand execution of applications and functions. Moreover, each host computing device (or a subset thereof) may host dozens, hundreds, or thousands (or more) individual VCCs. The quantity of VCCs executing across the fleet of host computing devices 200 may be prohibitively large when considering the quantity of publicly-available IPv4 addresses that would be needed to allow for substantially direct communication to the VCCs by devices external to the on-demand code execution system 120. To solve this and other problems, individual host computing devices may be assigned a range of publicly-available IPV6 addresses with which the VCCs hosted by the individual host computing devices may be provisioned, as described in greater detail below.

In some embodiments, a component of the on-demand code execution system 120, such as a management subsystem 300, may manage the fleet of host computing devices 200A-200N. For example, when a host computing device is brought online, the management subsystem 300 may provision the host computing device with a particular set of network addresses-such as a range of IPV6 addresses with the same prefix unique to the host computing device—that is delegated to the host computing device to be assigned to VCCs on the host computing device.

In the illustrated example, host computing device 200A is delegated a range of IPV6 addresses all with the same prefix unique to the host computing device 200A: 2001:0db8:85a3: 8a2e: 0370::/80. Host computing device 200N is delegated a range of IPV6 addresses all with the same prefix unique to the host computing device 200N: 2001:0db8:85a3:8a2e: ff00::/80.

Figure 4:
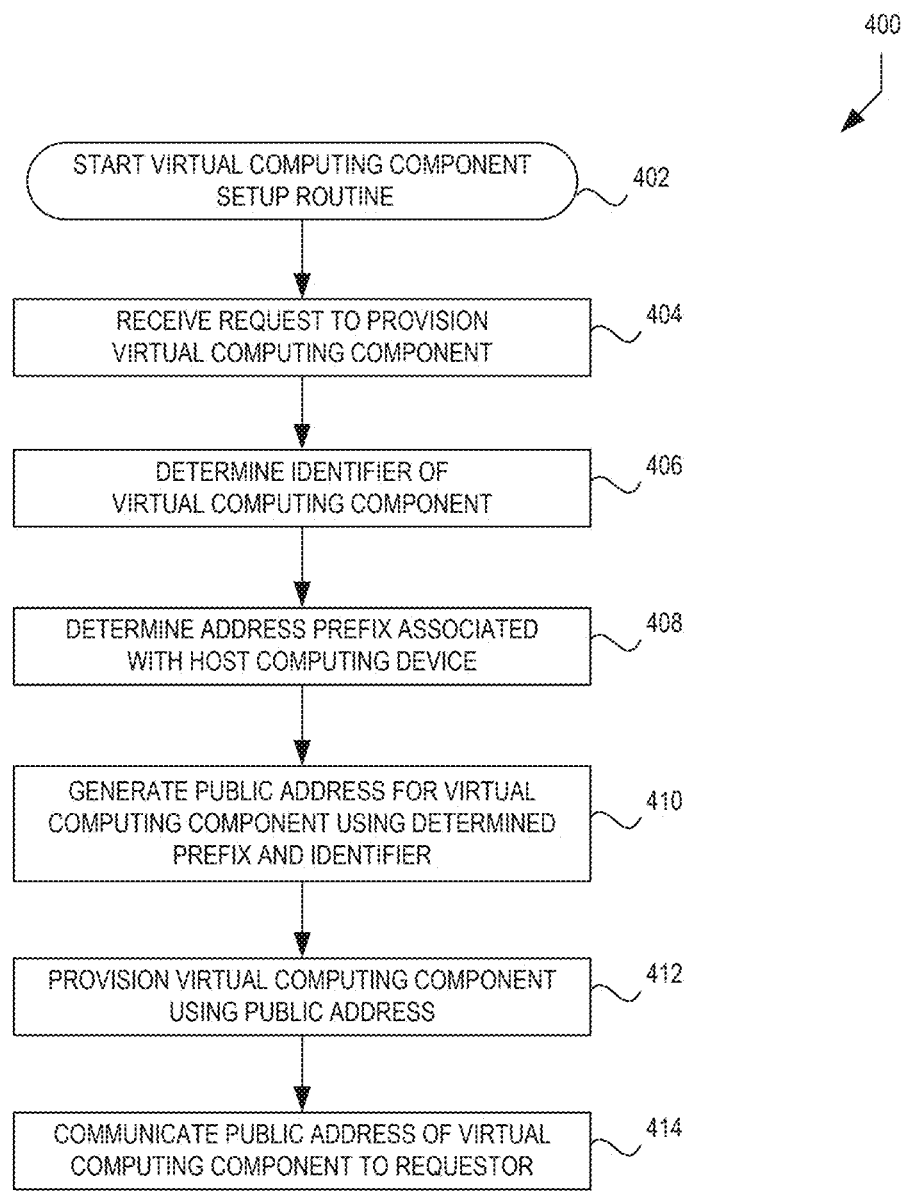
FIG. 4 is a flow diagram of an illustrative routine for provisioning a virtual computing component with a publicly-accessible network address according to some embodiments.

FIG. 4 is a flow diagram of an illustrative routine 400 for managing the provisioning of a VCC on a host computing device. Routine 400 may be executed by a host computing device or a component thereof, such as a hypervisor or orchestrator process. Routine 400 will be described with reference to the illustrative data flows and interactions illustrated in FIG. 5.

Routine 400 begins at block 402. Routine 402 may begin in response to an event, such as in response to initialization of a host computing device or a component thereof, such as a hypervisor or orchestrator process. When the routine 400 is initiated, a set of executable program instructions stored on one or more non-transitory computer-readable media (e.g., hard drive, flash memory, removable media, etc.) may be loaded into memory (e.g., random access memory or "RAM") of the host computing device and executed by one or more processors. In some embodiments, routine 400 or portions thereof may be implemented on multiple processors, serially or in parallel.

At block 404, the host computing device may receive a request to provision a VCC. In some embodiments, the request may originate from a device external to the on-demand code execution system 120, such as a client device 102. For example, a client device 102 may request initialization of an application, execution of a function, or the like. The request may be sent to the on-demand code execution system 120, where it is received by a frontend 130 and forwarded to a particular host computing device.

At block 406, the host computing device may determine an identifier of the VCC that is to be provisioned. In some embodiments, each VCC of a host computing device may be assigned a unique identifier. For example, each VCC may be assigned a numeric, alphanumeric, or hexadecimal identifier by which the VCC can be identified separately from each other VCC on the host computing device. When a request to start an application is received, the host computing device may determine a unique identifier for the VCC in which the application is to execute. In some embodiments, a host computing device may be pre-provisioned with a set of VCCs in anticipation of a request to execute an application. In such embodiments, when a request is received an unused VCC is selected and its unique identifier may be determined.

At block 408, the host computing device can determine the address prefix to be used in generating a public address for the VCC. The prefix may be the prefix assigned to the host computing device itself. For example, the host computing device 200A shown in FIG. 5 has been assigned a pool of addresses in the range 2001:0db8:85a3:8a2e: 0370::/ 80, each with a prefix that is the same.

At block 410, the host computing device can generate a public address for the VCC in which the application, function, or other requested code is to execute. In some embodiments, the public address may be generated using the prefix determined above, and the VCC identifier determined above. For example, the host computing device may use an algorithm in which the VCC identifier is converted into the portion of the address that follows the prefix. The algorithm may use or generate additional data, such as by generating a random address portion as a sequence of random numbers that may be added to the prefix as padding before the identifier of the VCC is added.

In one specific non-limiting embodiment, a 128 bit IPv6 address of a VCC is generated as the 80-bit IPv6 prefix of host computing device and 48 bits generated from the identifier of the VCC and randomly-generated bits. For example, if the identifier of the VCC is i bits in length, then j bits of data may be generated using a pseudo random number generator (PRNG), where j=48−i. The address of the VCC may then be generated by concatenating the 80-bit IPv6 prefix of the host computing device, the j randomly-generated bits, and the i bits representing the identifier of the VCC.

Figure 5:
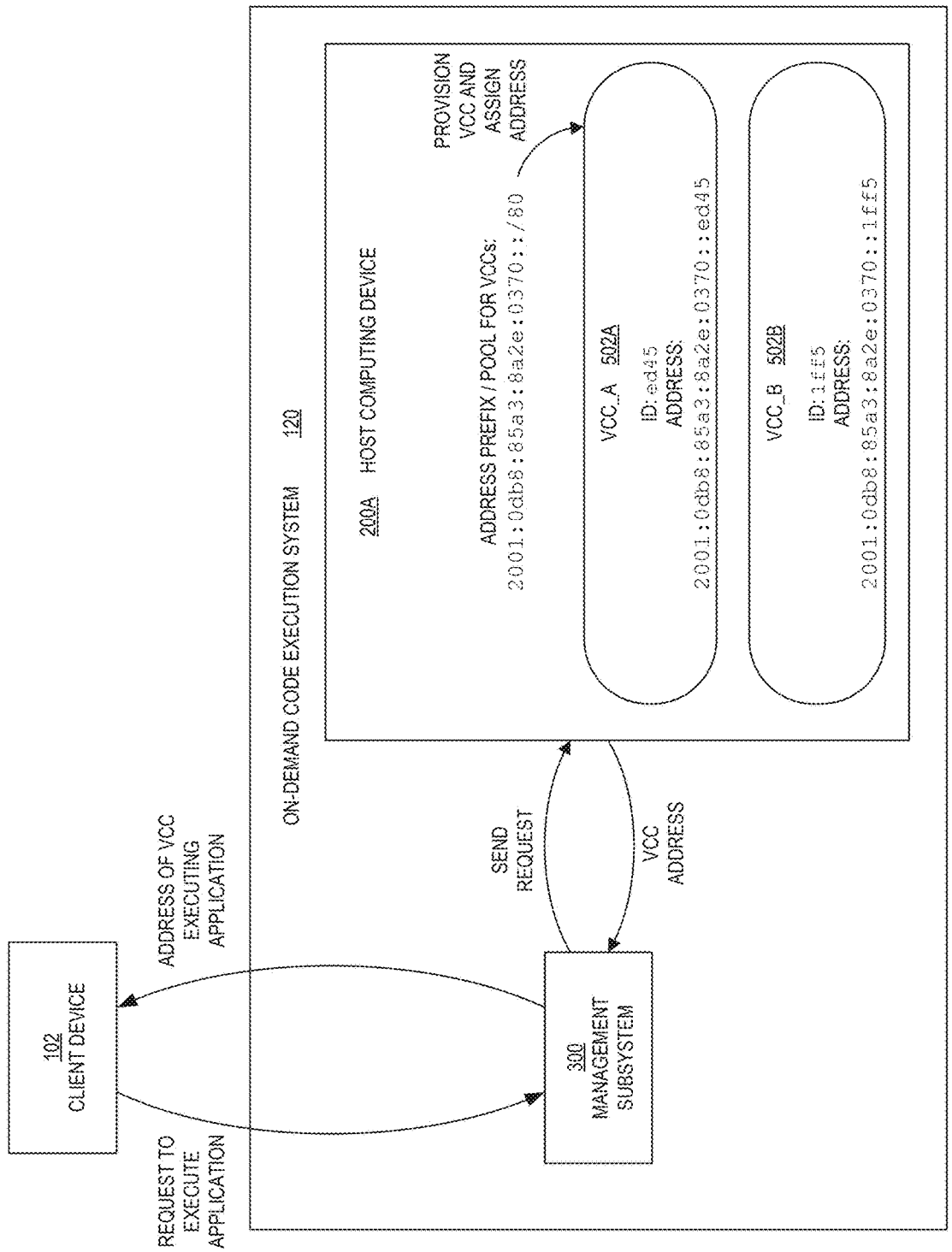
FIG. 5 illustrates data flows and interactions between an external device and components of an on-demand code execution system for provisioning a virtual computing component with a publicly-accessible network address according to some embodiments.

In the example shown in FIG. 5, VCC_A 502A has an identifier represented in hexadecimal form as "ed45." The prefix of the address of the host computing device 200A, and the address pool assigned to the host computing device 200A for VCCs, is 2001:0db8:85a3:8a2e: 0370::. Using these two items of data, the host computing device 200A has assigned VCC_A 502A an address of 2001:0db8:85a3:8a2e: 0370::ed45. VCC_B 502B has an identifier of 1ff5. The prefix of the address of the host computing device 200A, and the address pool assigned to the host computing device 200A for VCCs, is 2001:0db8:85a3:8a2e: 0370::. Using the identifier and the prefix of the address of the host computing device 200A, the host computing device 200A has assigned VCC_B 502B an address of 2001:0db8:85a3:8a2e: 0370:: 1ff5.

At block 412, the host computing device may provision a VCC using the public address generated above. Provisioning the VCC may include obtaining an image of application or function code to be launched within the VCC. For example, the VCC may be a container including a prepackaged set of code configured to provide application functionality requested by an external device. The VCC may be assigned the public address generated above such that packets communicated to the address-even from outside of the on-demand code execution system 120—are sent to the VCC.

At block 414, the host computing device may communicate the public address of the VCC to the device that requested execution. As shown in FIG. 5, the host computing device 200A may provide an address of a VCC to the management subsystem 300, which may then return the address to the client device 102. For example, if VCC_A 502A is launched to execute an application in response to a request from a client device 102, then the host computing device 200A may provide the public address of VCC_A 502A to the management subsystem 300 or directly to the client device 102.

Figure 6:
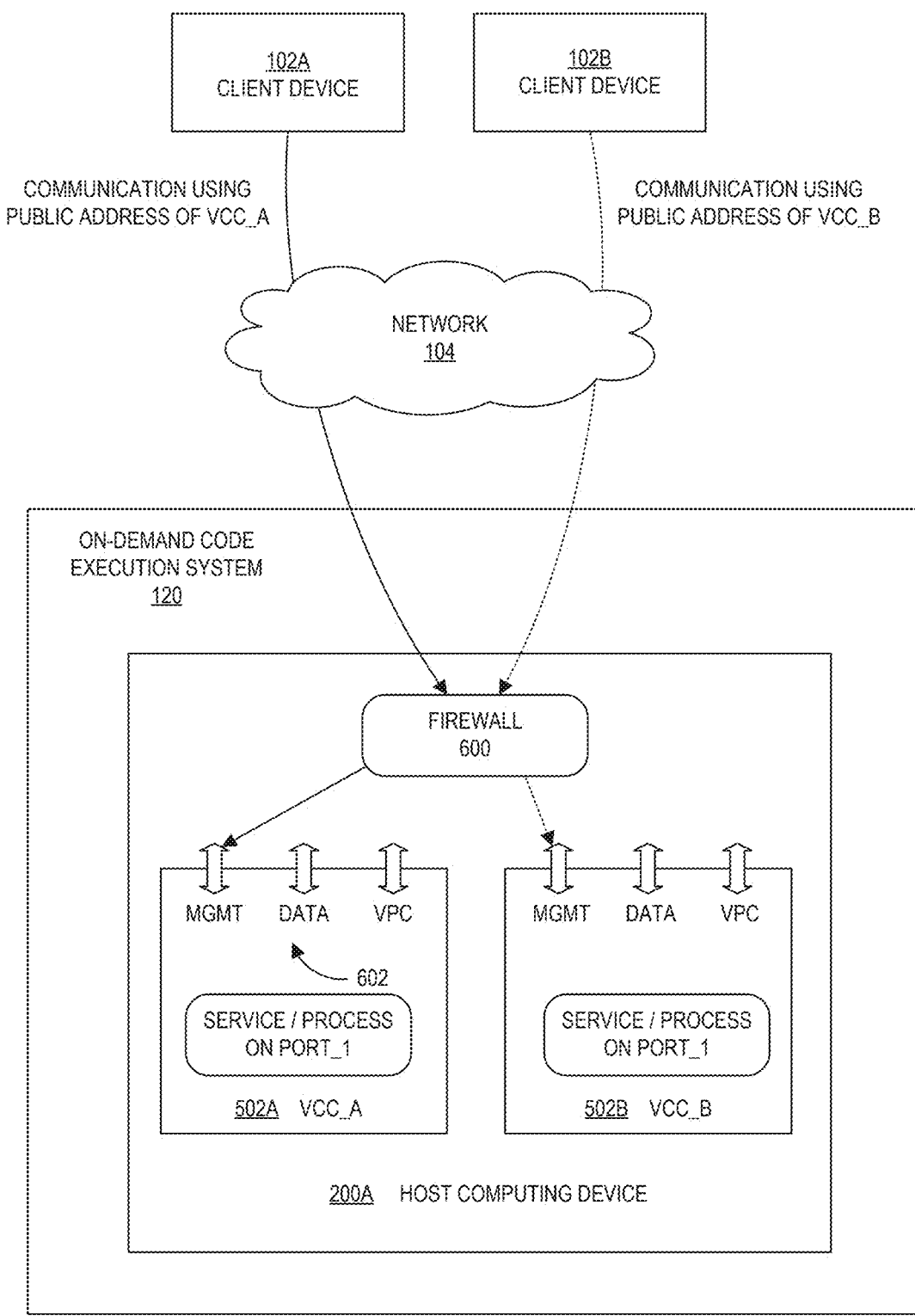
FIG. 6 illustrates external devices communicating with virtual computing components using publicly-accessible network addresses according to some embodiments.

FIG. 6 illustrates use of public addresses to communicate with VCCs, even if the client devices using the addresses are outside the on-demand code execution system 120. As shown, a client device 102A sends a communication to VCC_A 502A, executing within host computing device 200A of on-demand code execution system 120, using the public address of VCC_A that was previously provided to the client device 102A. Client device 102B sends a communication to VCC_B 502B, executing within the same host computing device 200A, using the public address of VCC_B that was previously provided to the client device 102B. The communications may be routed to the host computing device 200A based on, e.g., all addresses with the same prefix as the host computing device 200A being assigned to the host computing device 200A. Within the host computing device 200A, the communications may be routed to the appropriate VCC based on the particular address of the destination VCC used in the communications.

In some embodiments, as shown, the host computing device 200A may include a firewall 600. The firewall 600 may control access to the VCCs of the host computing device 200A, and prevent access from some client devices even if communications are sent to an existing address. For example, when a client device requests execution of an application and a VCC is provisioned to execute the application as described above, the host computing device 200A may add a firewall rule to the firewall 600 limiting access to the VCC to only the requesting client device even though the address of the VCC is a public address. In the example illustrated in FIG. 6, if client device 102A requested execution of an application for which VCC_A 502A was provisioned, then the firewall 600 may only permit communications to VCC_A 502A-using the public address of VCC_A 502A—from client device 102A. If client device 102B were to send a communication to VCC_A 502A, the firewall 600 can block the communication, even though client device 102B may be permitted to send a communication to VCC_B 502B.

In some embodiments, the host computing device 200A may set up multiple interfaces for each VCC or a subset thereof. For example, VCC_A 502A is shown with three interfaces 602: a management interface, a data interface, and virtual private cloud (VPC) interface. These network interfaces are attached to a tap device in the host computing device 200A. The management subsystem 300 or some other component of the on-demand code execution system 120 may assign an IPV6 address to the tap device attached to the management interface in VCC_A 502A. This IPV6 address will contain the IPV6 prefix of the host computing device 200A. Application owners or other users may directly access their service/process using the IPV6 address of the management interface. No proxy or NAT will be performed by the on-demand code execution system 120. Because the VCC address contains the prefix of the public address of the host computing device, entities outside the host computing device and outside the on-demand code execution system 120 will be able to route requests to the host and from host to the VCC using IP routing. Moreover, ingress network connectivity to a process/service inside a VCC may be permitted using the true port information of the process/service, without any proxy or destination port NAT functionality.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
  a management subsystem of an on-demand code execution service for on-demand execution of application code; and
  a plurality of host computing devices of the on-demand code execution service;
  wherein the management subsystem comprises one or more computing devices and is configured to:
    assign, to a host computing device of the plurality of host computing devices, a pool of network addresses available for virtual computing components instantiated on the host computing device, wherein a prefix of each network address of the pool of network addresses comprises a same host computing device-specific prefix assigned to the host computing device, and wherein each network address of the pool of network addresses is to be accessible from outside the on-demand code execution service;

receive, from a client device external to the on-demand code execution service, a request to execute application code; and send the request to the host computing device;

wherein the host computing device is configured to:

determine to configure a virtual computing component on the host computing device for execution of the application code, wherein the virtual computing component is associated with an identifier;

assign, to the virtual computing component, a network address of the pool of network addresses, wherein the network address comprises the prefix and is based on the identifier; and send the network address to the client device.

2. The system of claim 1, wherein the host computing device is further configured to:

generate a random address portion using a pseudo random number generator; and generate the network address using the prefix, the identifier, and the random address portion.

3. The system of claim 1, wherein the host computing device is further configured to:

receive, from the client device, a communication addressed to the network address; and send the communication to the virtual computing component based on the communication being addressed to the network address, wherein the communication comprises an encrypted communication, and wherein the communication is sent to the virtual computing component without terminating encryption such that the communication is encrypted end-to-end between the client device and the virtual computing component.

4. The system of claim 1, wherein the host computing device is further configured to:

configure a firewall of the host computing device to permit the client device to access to the virtual computing component using the network address.

5. A computer-implemented method comprising:

under control of a computing system comprising one or more computing devices configured to execute specific instructions:

assigning, to a host computing device of an on-demand code execution system comprising a plurality of host computing devices, a set of network addresses available for virtual computing components instantiated on the host computing device, wherein a prefix of each network address of the set of network addresses comprises a same host computing device-specific prefix, and wherein each network address of the set of network addresses is to be accessible from outside the on-demand code execution system;

determining to configure a virtual computing component on the host computing device for execution of application code, wherein the virtual computing component is associated with an identifier; and assigning, to the virtual computing component, a network address of the set of network addresses, wherein the network address comprises the prefix and is based on the identifier.

6. The computer-implemented method of claim 5, further comprising generating the network address using the prefix, the identifier, and a random address portion.

7. The computer-implemented method of claim 5, further comprising:

receiving, from an external computing device outside of the on-demand code execution system, a communication addressed to the network address; and sending the communication to the virtual computing component based on the communication being addressed to the network address.

8. The computer-implemented method of claim 7, wherein the communication comprises an encrypted communication, and wherein the communication is sent to the virtual computing component without terminating encryption such that the communication is encrypted end-to-end between the external computing device and the virtual computing component.

9. The computer-implemented method of claim 5, further comprising initializing a container within a virtual machine on the host computing device, wherein the container is initialized using an image comprising the application code.

10. The computer-implemented method of claim 5, further comprising receiving a request, initiated by an external computing device outside of the on-demand code execution system, to execute the application code, wherein the virtual computing component is configured to execute the application code in response to the request.

11. The computer-implemented method of claim 10, further comprising sending the network address to the external computing device.

12. The computer-implemented method of claim 10, further comprising configuring a firewall of the host computing device to permit the external computing device to access to the virtual computing component using the network address.

13. The computer-implemented method of claim 5, further comprising:

determining to configure a second virtual computing component on the host computing device for execution of second application code, wherein the second virtual computing component is associated with a second identifier; and assigning, to the second virtual computing component, a second network address of the set of network addresses, wherein the second network address comprises the prefix and is based on the second identifier.

14. A system comprising:

computer-readable memory; and one or more processors in communication with the computer-readable memory and configured by executable instructions to:

assign, to a host computing device of an on-demand code execution system comprising a plurality of host computing devices, a set of network addresses available for virtual computing components instantiated on the host computing device, wherein a prefix of each network address of the set of network addresses comprises a same host computing device-specific prefix, and wherein each network address of the set of network addresses is to be accessible from outside the on-demand code execution system;

determine to configure a virtual computing component on the host computing device for execution of application code, wherein the virtual computing component is associated with an identifier; and assign, to the virtual computing component, a network address of the set of network addresses, wherein the network address comprises the prefix and is based on the identifier.

15. The system of claim 14, wherein the one or more processors are further configured to generate the network address using the prefix, the identifier, and a random address portion.

16. The system of claim 14, wherein the one or more processors are further configured to:

receive, from an external computing device outside of the on-demand code execution system, a communication addressed to the network address; and send the communication to the virtual computing component based on the communication being addressed to the network address.

17. The system of claim 16, wherein the communication comprises an encrypted communication, and wherein the communication is sent to the virtual computing component without terminating encryption such that the communication is encrypted end-to-end between the external computing device and the virtual computing component.

18. The system of claim 14, wherein the one or more processors are further configured to initialize a container within a virtual machine on the host computing device, wherein the container is initialized using an image comprising the application code.

19. The system of claim 14, wherein the one or more processors are further configured to:

receive a request, initiated by an external computing device outside of the on-demand code execution system, to execute the application code, wherein the virtual computing component is configured to execute the application code in response to the request;

configure a firewall of the host computing device to permit the external computing device to access to the virtual computing component using the network address; and send the network address to the external computing device.

20. The system of claim 14, wherein the one or more processors are further configured to:

determine to configure a second virtual computing component on the host computing device for execution of second application code, wherein the second virtual computing component is associated with a second identifier, and assign, to the second virtual computing component, a second network address of the set of network addresses, wherein the second network address comprises the prefix and is based on the second identifier.

* * * * *

UNITED STATES PATENT AND TRADEMARK OFFICE
CERTIFICATE OF CORRECTION

| | | |
|---|---|---|
| PATENT NO. | : 12,417,115 B1 | Page 1 of 1 |
| APPLICATION NO. | : 18/478749 | |
| DATED | : September 16, 2025 | |
| INVENTOR(S) | : Nashad Ahmed Safa | |

It is certified that error appears in the above-identified patent and that said Letters Patent is hereby corrected as shown below:

In the Specification

Column 7, Line 43, delete "application programing interface" and insert --application programming interface--.

Column 8, Line 22, delete "variety oOf storage" and insert --variety of storage--.

In the Claims

Column 24, Claim 20, Line 16, delete "second identifier, and" and insert --second identifier; and--.

Signed and Sealed this
Eleventh Day of November, 2025

John A. Squires
*Director of the United States Patent and Trademark Office*